Aug. 29, 1939.  H. R. ELLINWOOD  2,170,982
DUAL CONTROL MECHANISM
Filed June 1, 1938
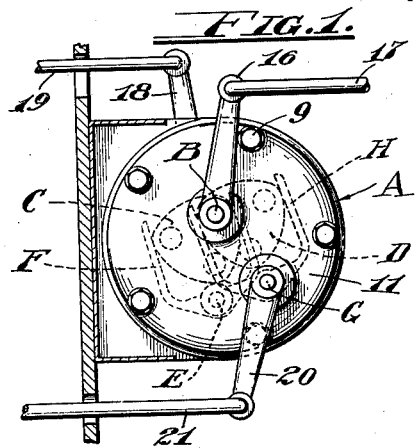
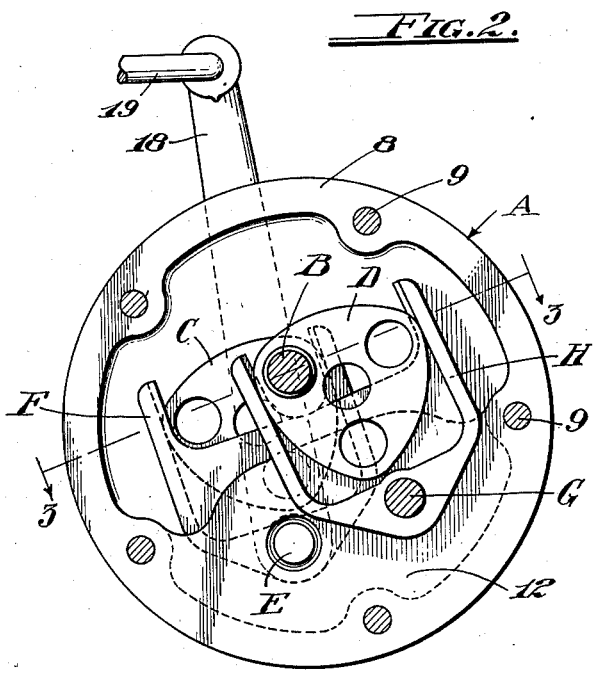
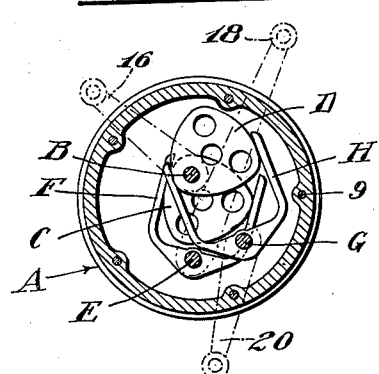
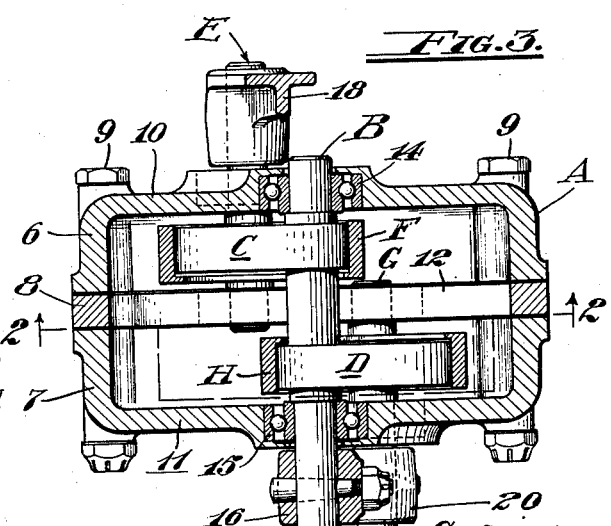
Inventor
Herman Ray Ellinwood
By R. S. Berry
Attorney Patented Aug. 29, 1939

2,170,982

UNITED STATES PATENT OFFICE 2,170,982

DUAL CONTROL MECHANISM

Herman Ray Ellinwood, Los Angeles, Calif.

Application June 1, 1938, Serial No. 211,141

3 Claims. (Cl. 74—471)

This invention relates to a dual control mechanical movement for effecting transmission of reciprocal movement from a single source to a plurality of reciprocal movements at different points of application, and whereby, through the operation of a single control lever or the like, the dual control of a pair of associated adjustable mechanisms may be effected.

Another object is to provide a dual control unit which is so designed that it may be constructed to afford various relative reciprocal movements of a pair of controlled mechanisms by a single operation.

Another object is to provide a mechanical movement which is so constructed that it may be designed for use in transmitting from a single operating lever or the like either corresponding or differential movements to a pair of operated control levers or the like and whereby various definitely varying strokes of the operated control levers may be accomplished according to the objective to be attained.

Another object is to provide a mechanical movement of the above character which is precise and accurate in its operation and which embodies few parts of simple construction that may be readily assembled.

With the foregoing objects in view, together with such other objects and advantages as may subsequently appear, the invention is carried into effect as illustrated by way of example in the accompanying drawing, in which:

Fig. 1 is a view in side elevation with parts shown in section of a dual control unit showing the parts with the actuating mechanisms disposed in an intermediate position;

Fig. 2 is a view in section and elevation of the dual control unit as seen on the line 2—2 of Fig. 3 in the direction indicated by the arrows, with the parts disposed in the intermediate position shown in Fig. 1;

Fig. 3 is a horizontal section taken on the line 3—3 of Fig. 2;

Fig. 4 is a diagram of the control unit in section and elevation depicting the parts as disposed at one terminus of a stroke of the actuating lever; and Fig. 5 is a view in diagram similar to Fig. 4 showing the parts as disposed at the other terminus of the stroke of the actuating lever.

Referring to the drawing more specifically, A indicates generally an enclosed casing which may be of any suitable construction, but which is here shown as embodying a pair of complementary cap-like end sections 6 and 7 assembled on opposite sides of an intermediate web section 8, with such sections securely but detachably connected together by bolts 9 to form the casing A as an enclosed hollow cylindrical shell having end walls 10 and 11 and a central web 12 intermediate the end walls: the casing being enclosed to confine lubricating oil or grease.

Extending through the casing A eccentric to the axis thereof is a driving rock shaft B the end portions of which are journaled in bearings 14 and 15 carried by the end walls 10 and 11 respectively, and one end of which rock shaft projects through the end wall 11 and is fitted with an actuating lever arm 16 adapted to be manipulated to effect oscillation of the rock shaft B from any suitable point as through the medium of a connecting rod 17. Formed on the rock shaft B is a pair of spaced equilateral cams C and D having arcuate peripherial faces on each edge thereof and arranged in opposed eccentric relation to each other and to the shaft B, that is, with the wide portions and the narrow portions of the cams projecting away from each other on opposite sides of the axis of the shaft B as particularly shown in Fig. 2.

Extending through and journaled in the end wall 10 is a driven rock shaft E the inner end of which is journaled in the web 12 and on which rock shaft is mounted a yoke F having parallel side members extending astride the cam C in slidable contact with the contoured periphery of the latter. A lever arm 18 is affixed to the outer end of the shaft E and is connected at its outer end to a link 19 leading to the actuator of a control mechanism not shown.

Extending through and journaled in the end wall 11 is a driven rock shaft G the inner end of which is journaled in the web 12 and mounted on the rock shaft G is a yoke H having parallel side members which extend astride the cam D in slidable contact with the contoured periphery thereof.

Mounted on the outer end of the rock shaft G is a lever arm 20 which is connected at its outer end with a link 21 leading to any desired adjustable mechanism designed to be actuated thereby, and not necessary to be here shown.

As here illustrated the housing A is mounted in an upright position and carried on a panel with the rock shafts B, E and G extended horizontally and with the lever arms 16 and 18 on the shafts B and E extending upwardly and with the lever arm 20 on the rock shaft G extending downwardly. It will be manifest, however, that the structure may be disposed in any desired position and that the several lever arms may be extended from the rock shafts in any desired direction as occasion may require.

In the operation of the invention on rocking the driving rock shaft B in a counterclockwise direction from the intermediate position shown in Figs. 1 and 2 by moving the lever arm 16 rearwardly as indicated in dotted lines in Fig. 4, the cam C will be moved downwardly and to the right from the position shown in Fig. 2 to the position shown in Fig. 4 thereby acting to swing the yoke F and its associated driven rock shaft E to advance the lever arm 18 to the right and thus exert a pull on the link 19. During this operation the cam D while advancing with the shaft B effects no movement of the yoke H and its connections.

On turning the rock shaft B in a clockwise direction from the normal position shown in Figs. 1 and 2 the cam D acts to swing the yoke H to the left which action turns the driven rock shaft G so as to swing the lever arm 20 to the right as shown in Fig. 5 and thereby effect a pull on the link 21. During this operation the cam C while turning with the driving rock shaft B effects no movement of the yoke F and its associated driven rock shaft E.

It will readily be understood, however, that by varying the contours of the cams or rather their relative positions around the axis of the driving rock shaft B the transmitted motion to the driven rock shafts E and G may be varied so as to effect whatever relative movement and timing characteristics of the actuated mechanism controlled thereby that occasion may require.

While the invention is applicable for many uses where it is desired to effect two relative adjustments by a single manipulation, it is especially designed for use in effecting relative adjustments of the conventional and the automatic mixture control mechanisms of carburetors of the character now generally employed in airplane motors; the dual control unit enabling adjustment by a single manual control of two independent devices now generally separately adjusted. The movement is also adaptable for use in cameras for effecting combined relative adjustment of lens opening and shutter speed, and especially in motion picture cameras.

I claim:

1. In a dual control mechanism, a driving rock-shaft, a pair of cams on said rock-shaft, a pair of yokes arranged astride of and engaged by the working perimeters of said pair of cams, and a pair of driven rock-shafts carrying said yokes.

2. In a duel control mechanism, a casing, a driving rock-shaft carried by said casing, an actuating lever arm on said rock-shaft, a pair of cams on said driving rock-shaft interiorly of said casing, a pair of yokes arranged astride of and engaged by the working perimeters of said cams, a pair of driven rock-shafts carried by said casing on which said yokes are mounted, and a pair of lever arms on said driven rock-shaft.

3. In a dual control mechanism, an enclosed casing embodying a pair of end caps and an intermediate web section detachably connected together, a driving shaft extending into said casing, a pair of equilateral cams carried by said shaft arranged on opposite sides of said web section, a driven rock-shaft journaled in said web section and one of said end caps, a yoke on said rock shaft extending astride one of said cams, a second rock-shaft journaled in said web section and the other of said end caps, a yoke on said last named rock-shaft extending astride the other of said cams, means for imparting motion to the cam carrying shaft, and separate means for transmitting motion from each of said rock-shafts.

HERMAN RAY ELLINWOOD.